C. A. PARSONS, A. Q. CARNEGIE & S. S. COOK.
GEAR CUTTING MACHINE.
APPLICATION FILED MAY 1, 1916.

1,209,198.

Patented Dec. 19, 1916.

Witnesses:

Inventors:
Charles A. Parsons,
Alfred Q. Carnegie,
Stanley S. Cook,
Attorneys.

UNITED STATES PATENT OFFICE.

CHARLES ALGERNON PARSONS AND ALFRED QUINTIN CARNEGIE, OF NEWCASTLE-UPON-TYNE, AND STANLEY SMITH COOK, OF WALLSEND, ENGLAND; SAID CARNEGIE AND SAID COOK ASSIGNORS TO SAID PARSONS.

GEAR-CUTTING MACHINE.

1,209,198.   Specification of Letters Patent.   Patented Dec. 19, 1916.

Original application filed February 27, 1914, Serial No. 821,500. Divided and this application filed May 1, 1916. Serial No. 94,844.

*To all whom it may concern:*

Be it known that we, CHARLES ALGERNON PARSONS, K. C. B., of Heaton Works, Newcastle-upon-Tyne, Northumberland, ALFRED QUINTIN CARNEGIE, residing at Heaton Works, Newcastle-upon-Tyne, in the county of Northumberland, and STANLEY SMITH COOK, residing at Turbinia Works, Wallsend-on-Tyne, in the county of Northumberland, England, subjects of the King of Great Britain and Ireland, have invented certain new and useful Improvements in Gear-Cutting Machines, of which the following is a specification.

This invention relates to the means for cutting the teeth in gear wheels such as are described in application Serial Number 821,500, filed February 27, 1914.

Figure 1:
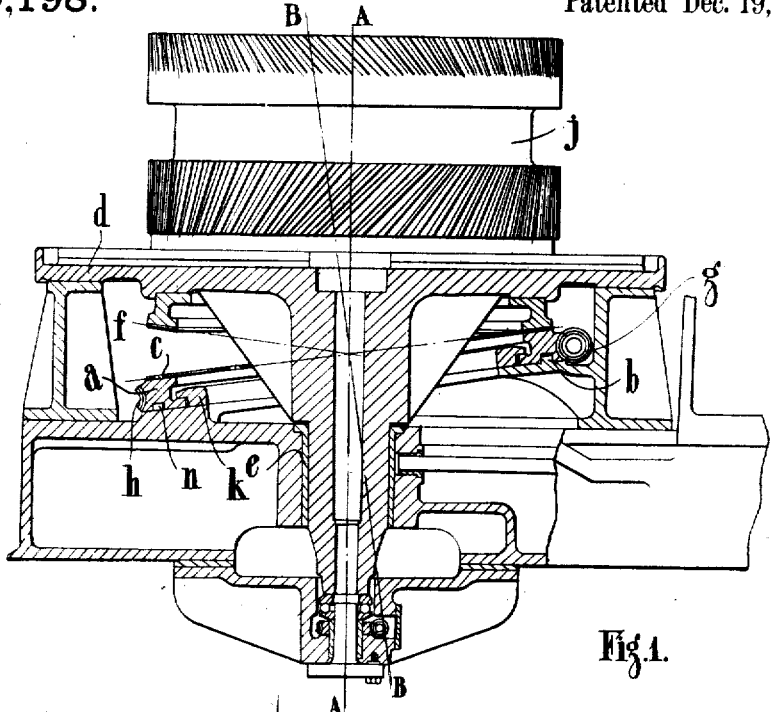
Figure 2:
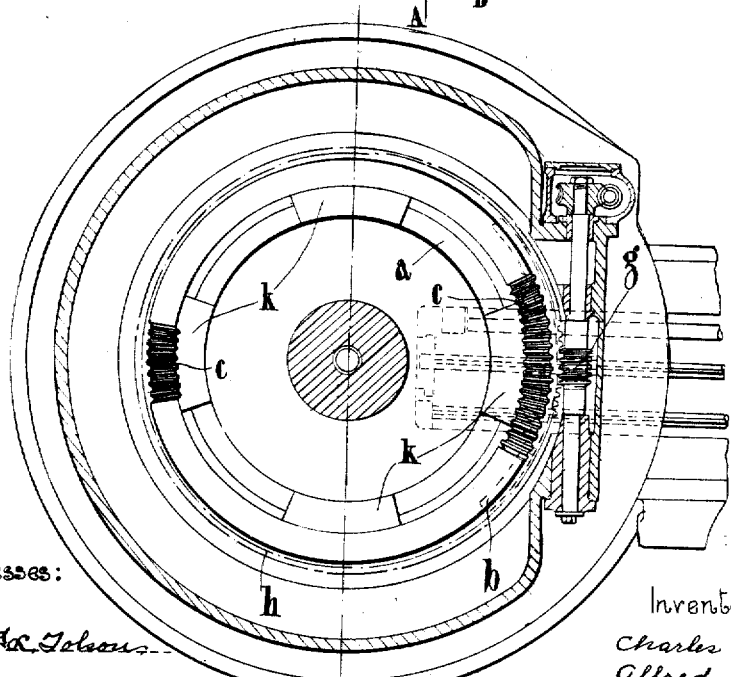

Referring to the accompanying drawings:—Figure 1 is a part sectional elevation of a gear cutting machine embodying the present invention. Fig. 2 is a part sectional plan of Fig. 1.

In carrying the invention into effect according to the present construction the driving or indexing wheel which may take the form of a ring $a$ is placed in an inclined position and is constrained to rotate about its axis B B by any suitable means such for example as the projection $b$ upon the bed which co-acts with a groove $m$ in the ring element $a$, the element $a$ being further constrained by the dogs $k$. It will be seen that the result of this construction is that the element $a$ rotates about its axis B B which is non-coincident with the axis A A about which the work table $d$ rotates.

Upon the element $a$ indexing worm teeth $h$ are formed and are engaged by the worm $g$. The teeth $c$ in this construction are formed upon the upper face of the ring $a$ and engage bevel teeth $f$ carried upon the work table. The diameter of the pitch circle of the teeth $c$ is slightly different from the pitch circle of the teeth $f$, the pitch circle of $c$ being preferably greater than the pitch circle of $f$.

It will be noticed that as the teeth $f$ and $c$ engage over a considerable arc the motion imparted by the teeth $c$ to the teeth $f$ depends upon the average accuracy of a number of teeth instead of depending upon the accuracy of one or two teeth.

It will be understood that although the element $a$ has been described as a ring, it may in some cases take the form of a more or less solid wheel element. When formed as a ring, however, it is desirable that the teeth $f$ and $c$ should be arranged to engage at a point near the engagement of the parent gears $g$ and $h$.

It will be seen that owing to the rotary motion imparted by the element $a$ to the table $d$, being at a slightly different angular speed from that of the element itself a suitable shift of phase of the work table in relation to the driven member $h$ of the parent or indexing gear in successive revolutions of the work table is obtained.

Having now described our invention, what we claim as new and desire to secure by Letters Patent is:—

1. In combination in a gear cutting machine, a work table, a ring element, means acting to constrain said element to rotate about an axis inclined to the axis of rotation of said table, teeth upon said ring, driving means engaging said teeth, teeth upon said table, teeth upon said ring co-acting with said table teeth to transmit rotary motion to the table, said co-acting teeth having slightly different pitch circle diameters.

2. In combination in a gear cutting machine, a work table, a ring element, means acting to constrain said element to rotate about an axis non-coincident with the axis of rotation of said table, teeth upon said ring, driving means engaging said teeth, bevel teeth upon said table, teeth upon said ring co-acting with said bevel teeth to transmit rotary motion to the teeth, said co-acting teeth having slightly different pitch circle diameters.

3. In combination a work table, a circular element adapted to rotate about an axis non-coincident with the axis of rotation of said table, means to rotate said element, a ring of teeth upon one face of said element, bevel teeth upon said table, said ring of teeth and said bevel teeth co-acting to rotate said table at a different rate from said element.

4. In combination a work carrying member, a circular element, means acting to constrain said element to rotate about an axis inclined to the axis of rotation of said member, said means comprising a stationary inclined surface, a projection upon said surface, said projection co-acting with a groove in one face of said element, a ring of teeth upon the other face of said element, teeth upon the periphery of said element, a driving worm engaging said teeth, bevel teeth upon said member, said ring of teeth and said bevel teeth co-acting to rotate said member at a different rate from said element.

In testimony whereof, we have affixed our signatures.

CHARLES ALGERNON PARSONS.
ALFRED QUINTIN CARNEGIE.
STANLEY SMITH COOK.